# United States Patent [19]

Toyomoto

[11] 4,066,147
[45] Jan. 3, 1978

[54] AUTOMATIC LUBRICATING DEVICE FOR REMOTELY OPERABLE BOWDEN CABLE

[76] Inventor: Hiromitsu Toyomoto, 1-17-24, Hanaten-higashi, Tsurumi, Osaka, Japan

[21] Appl. No.: 690,934

[22] Filed: May 28, 1976

[30] Foreign Application Priority Data

June 4, 1975 Japan ................ 50-75971

[51] Int. Cl.² .............................................. F16N 1/00
[52] U.S. Cl. .................................... 184/15 R; 74/489
[58] Field of Search ................ 184/15 R, 15 A, 15 B, 184/16, 17; 74/487, 488, 489

[56] References Cited

U.S. PATENT DOCUMENTS

| | | | |
|---|---|---|---|
| 1,589,108 | 6/1926 | Caretta | 184/15 R |
| 2,201,426 | 5/1940 | Bratz | 184/15 R |
| 2,251,699 | 8/1941 | Banschbach | 184/15 R X |
| 2,531,095 | 11/1950 | Williams | 184/16 |
| 2,712,862 | 7/1955 | Pemberton | 184/15 R X |
| 3,808,908 | 5/1974 | Guerr | 74/489 |

FOREIGN PATENT DOCUMENTS 346,953 4/1931 United Kingdom .............. 184/15 R

Primary Examiner—David H. Brown
Attorney, Agent, or Firm—Armstrong, Nikaido & Marmelstein

[57] ABSTRACT

There is disclosed an automatic lubricating device for a remotely operable bowden cable which consists of an outer wire and an inner wire relatively frictionally slidably inserted in said outer wire and which is connected between operating means and actuating means so that the actuating means may be remotely operated by pulling the inner wire of the bowden cable, wherein an oil cover provided with an inner-wire receiving aperture is interposed between an outer-wire holding cap directly supporting the end of the outer wire and an oil cover attaching bracket fixed to one or each of said operating and actuating means, and lubricating oil is enclosed in a lubricating oil storage chamber formed in said oil cover, said lubricating oil being applied to the inner wire inserted in said inner-wire receiving aperture, the arrangement being such that the back and forth movement of the inner wire produced as a result of the operation of the operating means is utilized to cause said lubricating oil to flow along the relative slide interface between the inner and outer wires.

9 Claims, 5 Drawing Figures

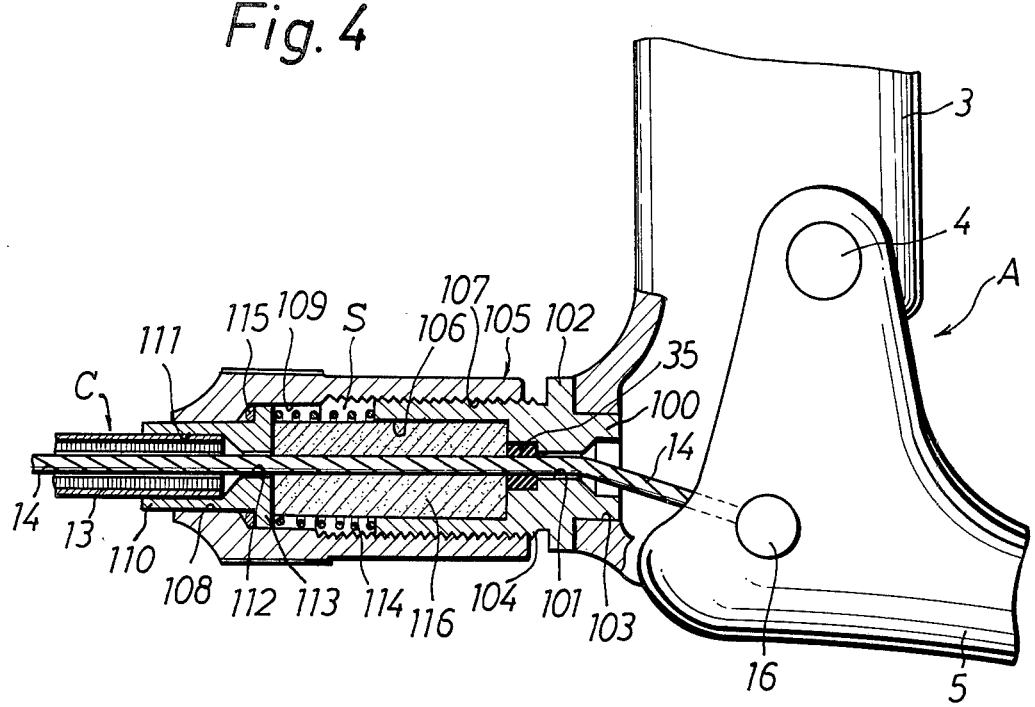
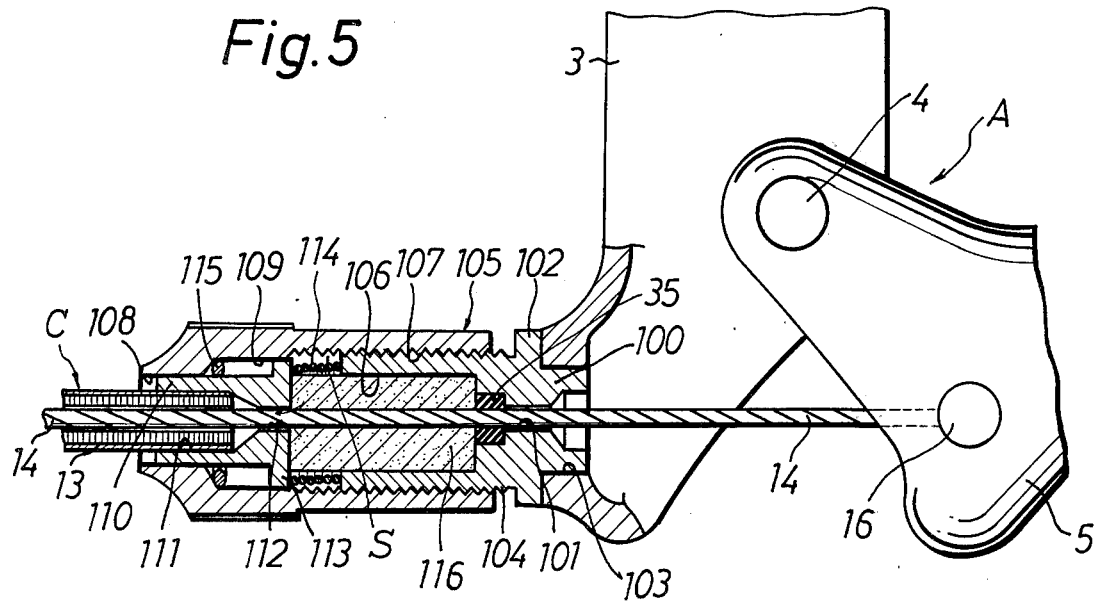

4,066,147

AUTOMATIC LUBRICATING DEVICE FOR REMOTELY OPERABLE BOWDEN CABLE

BACKGROUND OF THE INVENTION

The present invention relates to an automatic lubricating device for a remotely operable bowden cable.

For example in remotely operable brake mechanisms or clutch mechanisms in various vehicles, use is made of a bowden cable (sometimes called a release cable or push-pull cable) consisting of an outer wire in the form of a coiled spring covered with a plastic tube and an inner wire in the form of a stranded wire inserted in said outer wire, said bowden cable being operatively connected between the actuating means and operating means for said mechanism so that when the inner wire is pulled to operate said mechanism, a relative movement is produced between said inner and outer wires. In this connection, problems arise in that a frictional phenomenon is produced in the relative slide interface between the two wires, thus interfering with the smoothness of the remote operation and decreasing the durability of the bowden cable.

To solve the problems, there has heretofore been placed on the market a bowden cable having lubricating oil applied to the relative slide interface between the two wires in advance.

However, when such bowden cable is put to long-term use and the inner wire is repeatedly operated by being pulled, the lubricating oil will soon dry up, resulting in the loss of the lubricating performance of the relative friction slide interface. Practically, it is very difficult to re-inject lubricating oil into the bowden cable once installed between the actuating means and operating means of said mechanism. In other words, in order to replenish the relative friction slide interface with lubricating oil, the opposite ends of the bowden cable must be completely separated from the actuating means and operating means of said mechanism and the inner wire must then be withdrawn from the outer wire, such operation requiring much trouble. Moreover, after the application of lubricating oil, the opposite ends of the bowden cable must be installed in said mechanism. Since such is the present situation, even if the lubricating performance of the bowden is aggravated, the tendency is to continue using it without replenishment of lubricating oil.

SUMMARY OF THE INVENTION

The present invention provides an automatic lubricating device for a remotely operable bowden cable designed to eliminate the problems described above. Thus, objects of the invention are, first, to enable the relative friction slide interface between the inner and outer wires of a bowden cable to be lubricated at all times without requiring the above described troublesome operation of removal and reinstallation of the bowden cable, and, second, to enable the relative friction slide interface between the inner and outer wires of a bowden cable to be automatically lubricated whenever the inner wire is pulled. Other objects will be apparent from the following description taken in connection with the accompanying drawings.

BRIEF DESCRIPTION OF THE DRAWINGS

The accompanying drawings illustrate the present invention applied to a side pull type caliper brake mechanism for bicycles.

FIG. 4 is an enlarged side view, in longitudinal section, similar to FIG. 2 but showing a third embodiment of the invention; and FIG. 5 is an enlarged side view, in longitudinal section, showing how the third embodiment works.

DESCRIPTION OF THE PREFERRED EMBODIMENTS

Figure 1:
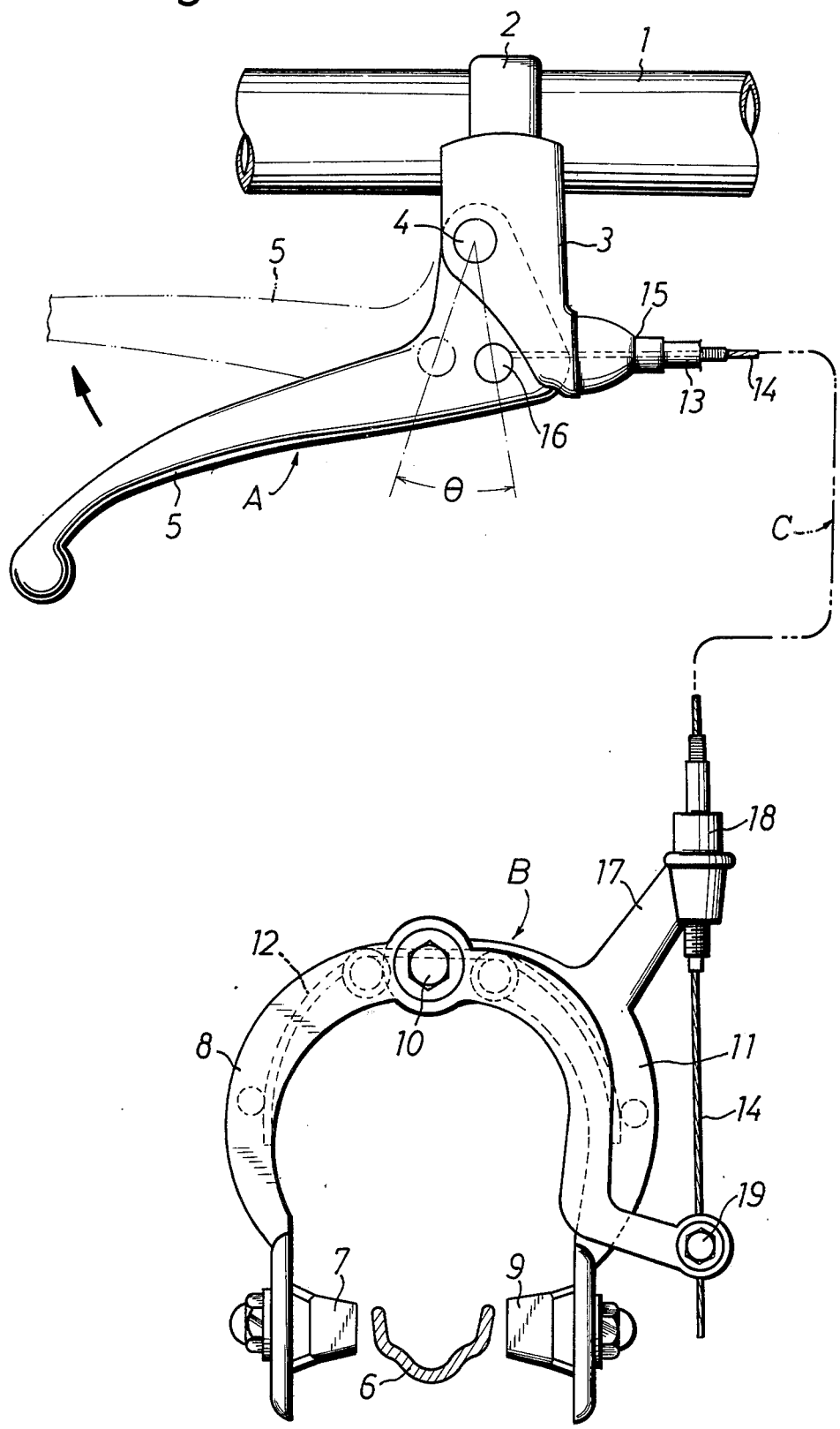
FIG. 1 is a developed side view, partly broken away, of the entire brake mechanism.

The accompanying drawings illustrate preferred embodiments of the present invention applied to a side pull type capliper brake mechanism for bicycles. In FIG. 1, A designates brake operating means. In the concrete, it consists of a housing 3 provided with a clamp band 2 fixed to the handle bar 1 of a bicycle, and an operating lever 5 attached to said housing 3 and pivotally mounted on a pivot 4. Designated at B is brake actuating means for braking the associated wheel of the bicycle. In the concrete, as a side pull type caliper brake, it consists of a major arch 8 having a shoe 7 mounted on the lower end thereof facing the rim 6 of the wheel, and a minor arch 11 which is similarly provided with a shoe 9 at the lower end thereof and which is pivotally connected to the major arch 8 by a bolt 10. Normally, the pair of shoes 7, 9 are urged away from each other by the force of a spring 12. When it is desired to brake the wheel, this is achieved by gripping the operating lever 5 to turn the latter around the axis of the pivot 4, thereby urging the shoes against the rim 6.

Designated at C is a bowden cable for remote operation purposes interlocking said brake operating lever A and brake actuating means B, said bowden cable consisting of an outer wire 13 in the form of a coiled spring covered with a plastic tube, and an inner wire 14 in the form of a stranded wire relatively friction-slidably inserted in wire 13. In this case, one end of the outer wire 14 is supported by an outer-wire holding member 15 fixed to said housing 3 and one end of the inner wire 14 inserted in said holder member 15 is connected to said operating lever 5 by a connector 16, while the other end of the outer wire 13 is supported by an outer-wire holding member 18 attached to the front end of the projecting arm 17 of said minor arch 11 and the other end of the inner wire 14 inserted in said holder member 18 is connected to the front end of said major arch 8 by a connector 19. In this manner, the bowden cable C establishes interlocked relation between the brake operating means A and brake actuating means B.

According to the present invention, a bowden cable lubricating device is incorporated in such brake mechanism, particularly as an outer-wire holding member.

Figure 2:
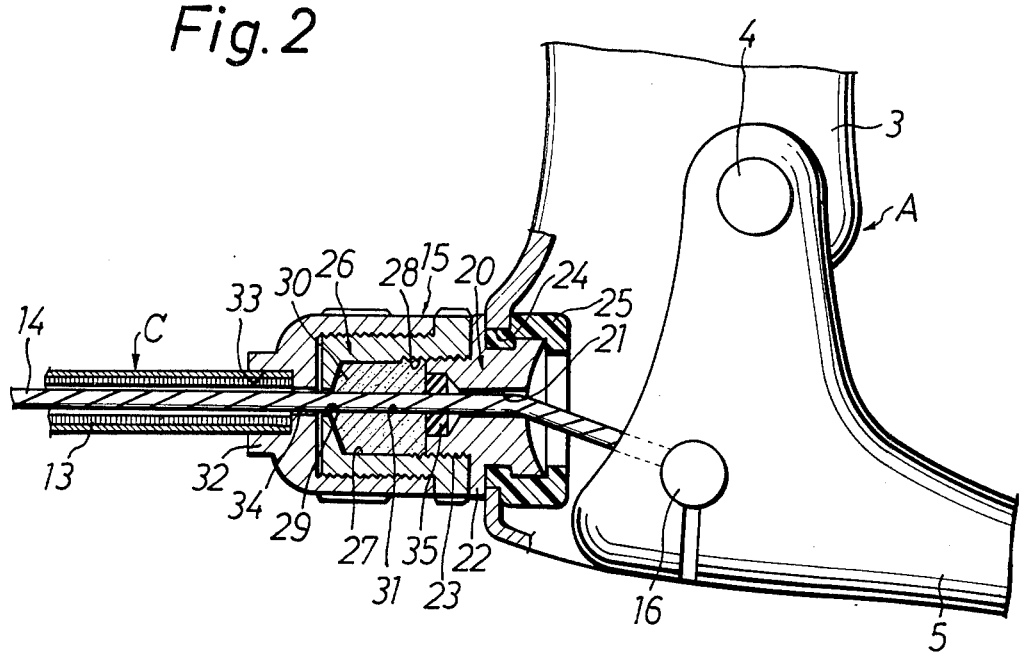
FIG. 2 is an enlarged side view, in longitudinal section, of a first embodiment of the invention installed in the operating means of the brake mechanism.

Thus, FIG. 2 illustrates a first embodiment of the invention incorporated in the outer-wire holding member on the side of the brake operating means A, wherein 20 designates an oil cover attaching bracket centrally formed with an inner-wire receiving aperture 21 for the bowden cable C. Designated at 22 is a flange projecting from an intermediate region of the outer surface of the bracket 20, and 23 is an external thread cut in the outer surface of said bracket 20 in a region in advance of said flange 22. Such bracket 20 is inserted at its base end portion in a mouth piece portion 24 formed on said housing 3 and is fixed to the housing 3 through an elastic ring 25 forced into a space between the mouth edge of said mouth piece 24 and the outer surface of the base end portion of the bracket 20.

Designated at 26 is an oil cover internally formed with a cylindrical, lubricating oil storage chamber 27 and having an internal thread 28 cut in the inner surface of the base end portion thereof for engagement with said external thread 23 whereby the oil cover is removably attached to the front end portion of the bracket 20 so as to cover the same. The front end portion of the oil cover 26 is centrally formed with an inner-wire receiving aperture 29 communicating with the above mentioned inner-wire receiving aperture 21 of the bracket 20 via the lubricating oil storage chamber 27. Designated at 30 is a felt member in the form of a cylinder impregnated with lubricating oil and enclosed in said lubricating oil storage chamber 27. In this case, however, instead of enclosing such felt member 30, lubricating oil of relatively high viscosity, preferably grease, may be stored in said lubricating oil storage chamber 27.

An outer-wire holding cap 32 for the bowden cable C is removably threadedly engaged with the front end portion of the oil cover 26 so as to cover the same, said cap having a recess 33 centrally formed in the front end thereof for receiving the end of the outer wire 13. Further, said holder cap 32 is centrally formed with an inner-wire receiving aperture 34 establishing communication between the recess 33 and the lubricating oil storage chamber 27 of the oil cover 26. Thus, in the case of the first embodiment of the invention, the outer-wire holding member 15 shown in FIG. 1 consists essentially of the bracket 20, oil cover 26 and holder cap 32.

The inner wire 14 having one end thereof connected to the operating lever 5 by the connector 16 and the other end thereof connected to the front end of the major arch 8 by the connector 19 is passed successively through the above-mentioned inner-wire receiving apertures 34, 29, 31 and 21 formed in the inner-wire holding cap 32, oil cover 26, felt member 30 and bracket 20, respectively, so that it is held in contact with the lubricating oil enclosed in the lubricating oil storage chamber 27. In addition, it is preferable that an oil seal 35 be installed between the lubricating oil storage chamber 27 of the oil cover 26 and the bracket 20, as illustrated.

Figure 3:
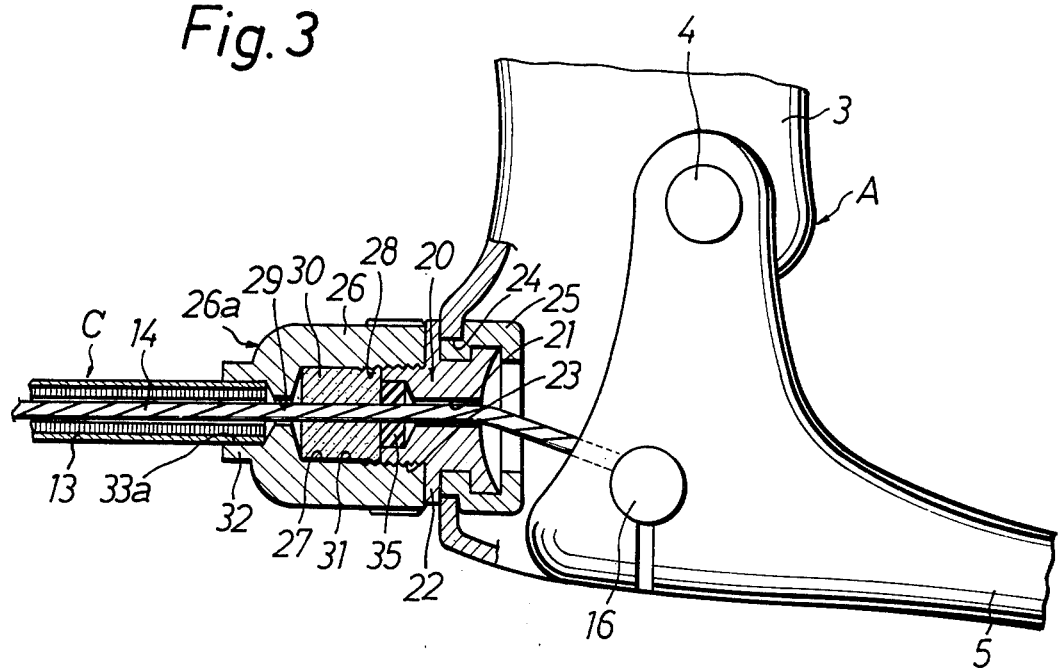
FIG. 3 is an enlarged side view, in longitudinal section, similar to FIG. 2 but showing a second embodiment of the invention.

FIG. 3 illustrates a second embodiment of the present invention, which differs in construction from the first embodiment shown in FIG. 2 in that instead of using the outer-wire holding cap 32 formed separate from and screwed on the oil cover 26 in the first embodiment, a recess 3a for receiving the end of the outer wire 13 is formed in the front end of an oil cover 26a so that the oil cap 26a has the function of an outer-wire holding cap. This means that in the case of the second embodiment, the outer-wire holding member 15 shown in FIG. 1 consists essentially of the bracket 20, and oil cover 26a. Since the rest of the construction is substantially the same as in the first embodiment, a detailed description thereof is omitted and the same reference characters as those used in FIG. 2 are used in FIG. 3 to indicate the components corresponding to those of the first embodiment.

In the first and second embodiments, the braking of the wheel by the brake actuating means B is effected in that the operating lever 5 of the brake operating means A is gripped through a fixed angle $\theta$ as shown in chain lines in FIG. 1 against the force of the spring 12 installed between the major and minor arches 8 and 11 so that the operating lever 5 is turned so as to pull the inner wire 14 of the bowden cable C, whereby the two arches 8 and 11 are contracted toward each other and hence the pair of shoes 7, 9 are urged against the rim 6. In this case, since the inner wire 14 has been introduced into the lubricating oil storage chamber 27 of the oil cover 26 or 26a and maintained in a condition in which the lubricating oil adheres thereto, the lubricating oil adhesion range established prior to the turning operation of the brake operating lever 5 is approximately equal to a fixed range corresponding to the size of the lubricating oil storage chamber 27, particularly the size of the felt member 30. Although the inner wire 14 is only lubricated with an oil film formed on the portion thereof in said limited region, the repeated turning operation of the operating lever 5 results in the repeated back and forth movement of the inner wire 14 in the lubricating oil storge chamber 27, so that each time the operating lever is turned, the above-mentioned initial oil film is fluidized to flow toward the place where the brake actuating means B is installed and eventually the relative friction slide interface between the inner and outer wires 14 and 13 can be effectively lubricated. Moreover, in the case of the brake mechanism of a bicycle, usually the brake operating means A is fixed to the handle bar 1 located above the level of the brake actuating means B. Therefore, according to the first and second embodiments of the invention, the lubricating oil flows down of itself along the inner wire 14 toward the place where the brake actuating means B is installed, so that there is achieved lubrication over a wide range substantially throughout the length of the bowden cable C.

FIGS. 4 and 5 illustrate a third embodiment of the invention, which differs in construction from the first and second embodiments shown in FIGS. 2 and 3 in that an arrangement is employed wherein when the operating lever 5 of the brake operating means A is turned to pull the inner wire 14, the resulting travel of the latter is utilized to cause the lubricating oil to positively flow out of the storage chamber 27 in such a manner that the lubricating oil is automatically forcibly fed under pressure so as to be able to lubricate the relative friction slide interface between the inner and outer wires 14 and 13 throughout the length of the bowden cable C.

This will now be described with reference to FIGS. 4 and 5. Designated at 100 is an oil cover attaching bracket centrally formed with an inner wire receiving aperture 101 for the bowden cable C and a flange 102 projecting from the outer surface of said bracket. The bracket 100 has its base end pressed into the mouth piece portion 3 of the housing 3. The front end portion projecting over a relatively long distance from said flange 102 has an external thread 104 cut in the outer surface thereof and is centrally cylindrically recessed. Designated at 105 is an oil cover internally formed with a cylindrical lubricating oil storage chamber 106. In this case, said storage chamber 106 is formed as a large chamber to communicate with the cylindrical recess in said bracket 100. The oil cover 105 is formed as a sleeve and the base end portion thereof is internally formed with an internal thread 107 to cooperate with the external thread 104 of the bracket 100 and is centrally formed with a guide port cylinder 108 for receiving the outer-wire holding cap. Designated at 109 is a slide surface formed on the inner surface of the oil cover 105 between the guide port cylinder 108 and the internal thread 107, said slide surface being cylindrical and having a greater diameter than that of the guide port cylinder 108.

Designated at 110 is an outer-wire holding cap for the bowden cable C, said cap being provided at the front end portion thereof with a recess 111 for directly supporting the end of the outer wire 13, and an inner-wire receiving aperture 112 which allows said recess 111 to communicate with the lubricating oil storage chamber 106 of the oil cover 105. The outer-wire holding cap 110 is forwardly and rearwardly slidably inserted in the guide port cylinder 108 of the oil cover 105 from inside the oil cover 105, and a flange 113 projecting from its base end is in slide contact with the cylindrical slide surface 109 of the oil cover 105, thereby preventing the outer-wire holding cap 110 from slipping off the guide port cylinder 108. The oil cover 105 is removably threadedly connected to the base end portion of the bracket 100 so as to cover the same, and in the interior thereof a coiled spring 114 for pressing the outer-wire holding cap 110 is disposed between the base end portion of the bracket 100 and the flange 113 of the outer-wire holding cap 110, said spring 114 maintaining a fixed amount of clearance S between the flange 113 and the bracket 100. In addition, designated at 115 is an oil seal installed on the inner surface of the oil cover 105 so as to cooperate with the spring 114 to clamp the flange 113 therebetween. The rest of the construction is substantially the same as in the first embodiment. Therefore, in FIGS. 4 and 5, the same reference characters as those used in FIG. 2 designate the same members or parts. Thus, in the third embodiment, the outer-wire holding member 15 shown in FIG. 1 consists essentially of the bracket 100, oil cover 105, and holder cap 110, and the lubricting oil storage chamber 106 is defined by these three elements.

In the third embodiment also, the braking of the wheel by the brake actuating means B is effected by turning the operating lever 5 so as to pull the inner wire 14 of the bowden cable C. In that case, according to the arrangement of the third embodiment, when the inner wire 14 is pulled as shown in FIG. 5, the outer wire 13 is pulled in the same direction owing to the friction between it and the inner wire 14 until the spring 114 reaches its compression limit to substantially block up the clearance S. Thus, the outer-wire holding cap 110 is slid along the guide port cylinder 108 of the oil cover 105 and the cylindrical slide surface 109 while compressing the spring 114. As a result, the pressure in the lubricating oil storage chamber 106 is increased, causing the luricating oil in the storage chamber 106 to flow out through the inner-wire receiving aperture 112 of the outer-wire holding cap 110.

That is, in response to the pulling of the inner wire 14 by the operating lever 5, the outer-wire holding cap 110 functions as a piston while the oil cover 105 functions as a cylinder. Thus, when the inner wire is pulled, the movement of the outer-wire holding cap 110 sliding in the oil cover 105 causes the lubricating oil in the lubricating oil storage chamber 106 to be positively fed under pressure as in an oil pump. In this case, the felt member 116 impregnated with lubricating oil is compression-deformed within the lubricating oil storage chamber 106 and the lubricating oil pressed out of the felt member 116 flows out through the inner-wire receiving aperture 112 of the outer-wire holding cap 110. Thus, each time the operating lever 5 is repeatedly operated, some of the lubricating oil is discharged, and as in the case of the first and second embodiments, the lubricating oil flows along with the back and forth movement of the inner wire 14, thereby providing a desirable lubricating effect on the relative friction slide interface existing between the inner and outer wires 14 and 13 of the bowden cable C throughout the length thereof. In addition, when the grip on the operating lever 5 is removed, the outer-wire holding cap 110 is, of course, automatically returned to the initial position shown in FIG. 4 by the action of the spring 114. The arrangements of the first to third embodiments may be incorporated as the outer-wire holding member 18 on the side of the actuating means B in the brake mechanism shown in FIG. 1. Thus, they may be incorporated in one or both of the operating and actuating means A and B.

As has so far been described, when the automatic lubricating device for a remotely operable bowden cable according to the present invention is employed, the relative friction slide interface between the inner and outer wires can be automatically lubricated and hence the durability of the bowden cable can be greatly increased. Further, such automatic lubricating device has many uses in that it can be applied not only to brake mechanisms for bicycles but also to brake mechanisms for various vehicles and to firing and extinguishing mechanisms for burners in gas-heated baths. As in the first to third embodiments, if the oil cover is arranged so that it can be removably threadedly connected to the attaching bracket, this is advantageous in that when the lubricating oil has been used up, the oil cover can be easily removed for furnishing a new supply of lubricating oil. Thus, the present invention is of great utility.

I claim:

1. In a remotely operating device including operating means having a fixed housing and an operating lever grippably pivotally mounted on said housing; actuating means disposed remotely from said operating means; and a bowden cable including an outer wire and an inner wire for interconnecting said operating means and said actuating means, the improvement comprising an automatic lubricating means for the bowden cable, said lubricating means comprising a bracket projecting from the housing and having an inner-wire receiving hole; an outer-wire holding means threadedly coupled to said bracket, for adjusting the outer wire said outer-wire holding means having a recess for receiving the outer wire and an inner-wire receiving hole; wherein when the outer-wire holding means is coupled to the bracket, an adjustable volume lubricating oil storage chamber is defined by the bracket and the outer-wire holding means; wherein one end of the inner wire is connected to the actuating means while the other end is passed through said receiving holes and said lubricating oil storage chamber and is connected to the operating lever and one end of the outer wire is connected to the actuating means and the other end is fitted in said recess of the outer-wire holding means; and wherein the interior of the bowden cable, between the outer and inner wires, communicates with said lubricating oil storage chamber through the inner-wire receiving hole formed in the outer-wire holding means whereby lubricating oil flows between said inner and outer wires thereby reducing friction therebetween.

2. A remotely operating device as set forth in claim 1 wherein said outer-wire holding means, comprises an oil cover threadedly coupled to said bracket and a holder cap having said recess therein coupled to said oil cover.

3. A remotely operating device as set forth in claim 1 wherein said outer-wire holding means comprises an oil cover having an integrally formed front portion with said recess therein.

4. A remotely operating device as set forth in claim 1 wherein a felt member impregnated with oil is provided in said oil chamber.

5. A remotely operating device as set forth in claim 1 wherein a lubricating oil of high viscosity is provided in said oil chamber.

6. In a remotely operating device including operating means having a fixed housing and an operating lever grippably pivotally mounted on said housing; actuating means disposed remotely from said operating means; and a bowden cable including an outer wire and an inner wire for interconnecting said operating means and said actuating means, the improvement comprising an automatic lubricating means for the bowden cable, said lubricating means comprising a bracket projecting from the housing and having an inner-wire receiving hole; an outer-wire holding means comprising an oil cover threadedly coupled to said bracket and an oil cap slidably fitted in said oil cover, said oil cap having a recess for receiving the outer wire and an inner wire receiving hole wherein said outer wire can be adjusted by movement of said oil cover relative to said bracket; wherein when the oil cover is fitted to the bracket, an adjustable volume lubricating oil storage chamber is defined by the bracket and the oil cover; wherein the volume of said storage chamber is variable with the forward and backward movement of the oil cap, and one end of the inner wire is connected to the actuating means while the other end passes through said receiving holes and the lubricating oil storage chamber and is connected to the operating lever and one end of the outer wire is connected to the actuating means while the other end is fitted in the recess of the oil cap for moving the oil cap in a direction which increases the pressure in the storage chamber when said operating lever is pulled and for restoring the oil cap to its original position when the operating lever is released; and wherein the interior of the bowden cable between the outer and inner wires communicates with said lubricating oil storage chamber through the inner-wire receiving hole formed in the oil cap whereby lubricating oil flows between said inner and outer wires thereby reducing friction therebetween.

7. A remotely operating device as set forth in claim 6 wherein said oil cap includes a flange positioned in the interior of said oil cover and wherein a spring is positioned in the interior of said oil cover between said flange and said bracket for biasing said oil cap away from said bracket.

8. A remotely operating device as set forth in claim 6 wherein a felt member impregnated with oil is provided in said oil chamber.

9. A remotely operating device as set forth in claim 6 wherein a lubricating oil of high viscosity is provided in said oil chamber.

* * * * *